(12) United States Patent
Aardema et al.

(10) Patent No.: US 7,293,579 B2
(45) Date of Patent: Nov. 13, 2007

(54) POPPET VALVE ARRANGEMENTS

(75) Inventors: James A. Aardema, Plainfield, IL (US); Rudy V. Mills, Manhattan, KS (US); David P. Smith, Joliet, IL (US)

(73) Assignee: Caterpillar Inc., Peoria, IL (US)

( * ) Notice: Subject to any disclaimer, the term of this patent is extended or adjusted under 35 U.S.C. 154(b) by 261 days.

(21) Appl. No.: 10/887,491

(22) Filed: Jul. 8, 2004

(65) Prior Publication Data
US 2006/0005885 A1    Jan. 12, 2006

(51) Int. Cl.
F16K 21/02 (2006.01)
F16K 15/02 (2006.01)

(52) U.S. Cl. .............. 137/513.3; 137/543.21

(58) Field of Classification Search ............. 137/513.3, 137/533.31, 538, 540, 543.19, 543.21
See application file for complete search history.

(56) References Cited

U.S. PATENT DOCUMENTS

| | | | |
|---|---|---|---|
| 883,928 A * | 4/1908 | Batchelder | 137/543.21 |
| 1,326,358 A * | 12/1919 | MacGregor | 137/543.19 |
| 2,653,792 A * | 9/1953 | Sacchini | 137/540 |
| 2,670,759 A * | 3/1954 | St Clair | 137/540 |
| 2,676,613 A * | 4/1954 | Baxter | 137/513.3 |
| 3,029,835 A * | 4/1962 | Biello et al. | 137/540 |
| 3,457,949 A * | 7/1969 | Coulter | 137/543.21 |
| 3,654,836 A | 4/1972 | Schexnayder | |
| 4,072,165 A | 2/1978 | Bradley, Jr. | |
| 4,362,185 A | 12/1982 | Kadner | |
| 4,437,492 A | 3/1984 | Taylor | |
| 4,610,423 A | 9/1986 | Morino | |
| 4,637,430 A | 1/1987 | Scheffel et al. | |
| 4,712,619 A | 12/1987 | Stepp et al. | |
| 4,766,930 A * | 8/1988 | Patti | 137/540 |
| 4,846,223 A * | 7/1989 | Humbert, Jr. | 137/625.19 |
| 5,137,254 A | 8/1992 | Aardema et al. | |
| 5,139,047 A | 8/1992 | Reinicke | |
| 5,421,545 A | 6/1995 | Schexnayder | |
| 5,645,263 A | 7/1997 | Aardema | |
| 5,709,368 A | 1/1998 | Hajek, Jr. | |
| 5,794,657 A * | 8/1998 | Oberg | 137/543.19 |
| 5,868,059 A | 2/1999 | Smith | |
| 6,047,944 A | 4/2000 | Hajek, Jr. | |
| 6,089,528 A | 7/2000 | Hajek, Jr. et al. | |
| 6,405,750 B1 | 6/2002 | Rogala | |

(Continued)

FOREIGN PATENT DOCUMENTS

FR    2599872 A1 *    8/1985    ............ 134/543.21

OTHER PUBLICATIONS

Caterpillar Engineering Print 105-4593.

Primary Examiner—John Rivell
(74) Attorney, Agent, or Firm—J. W. Burrows; Jeff A. Greene

(57) ABSTRACT

A poppet valve arrangement is provided and has a poppet slideably disposed therein. The poppet has an odd number of integral guide legs formed thereon about the periphery of the poppet. The odd number of integral guide legs are evenly spaced from one another and are of a size sufficient to permit fluid to freely flow thereby when unseated. The integral guide legs also function to permit the poppet to freely slide, without binding, within a bore of the poppet valve arrangement. The poppet having integral guide legs is compact, versatile, cost effective to produce and has good strength.

9 Claims, 4 Drawing Sheets

U.S. PATENT DOCUMENTS 6,546,839 B1 * 4/2003 Jamra et al. ............. 137/513.3
6,557,822 B1   5/2003 Yoshino
6,581,633 B2   6/2003 Andersson

* cited by examiner

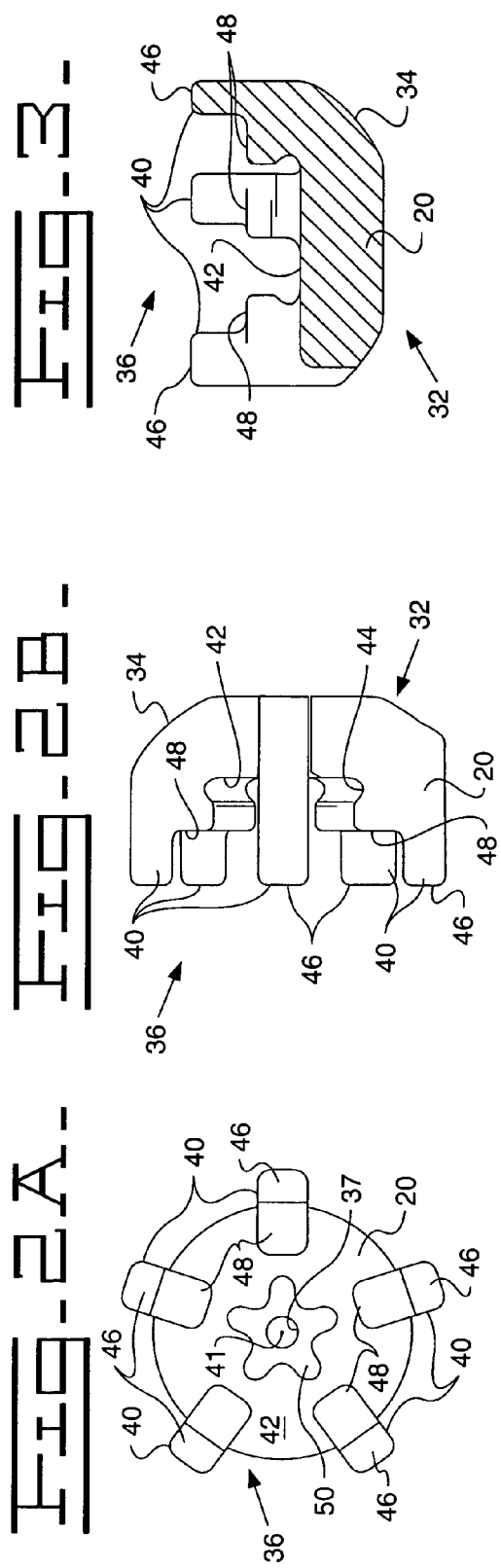

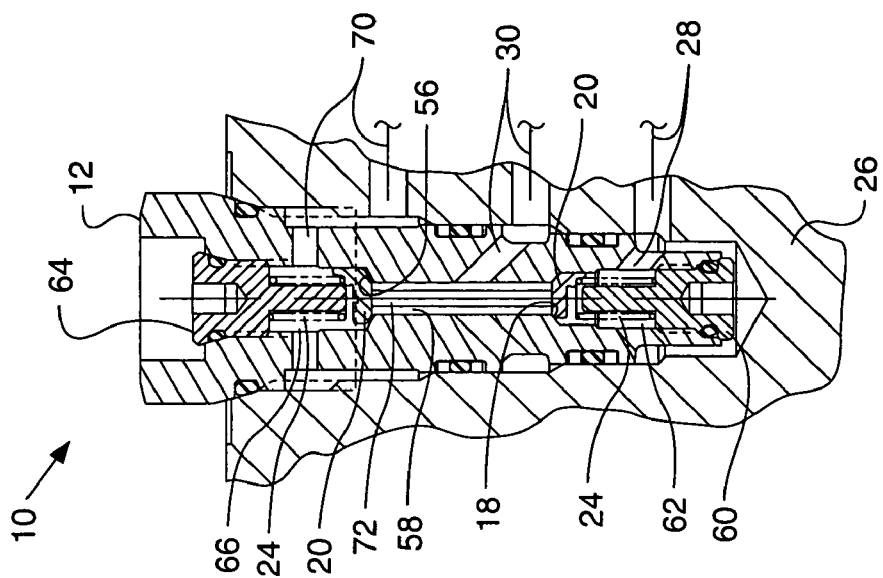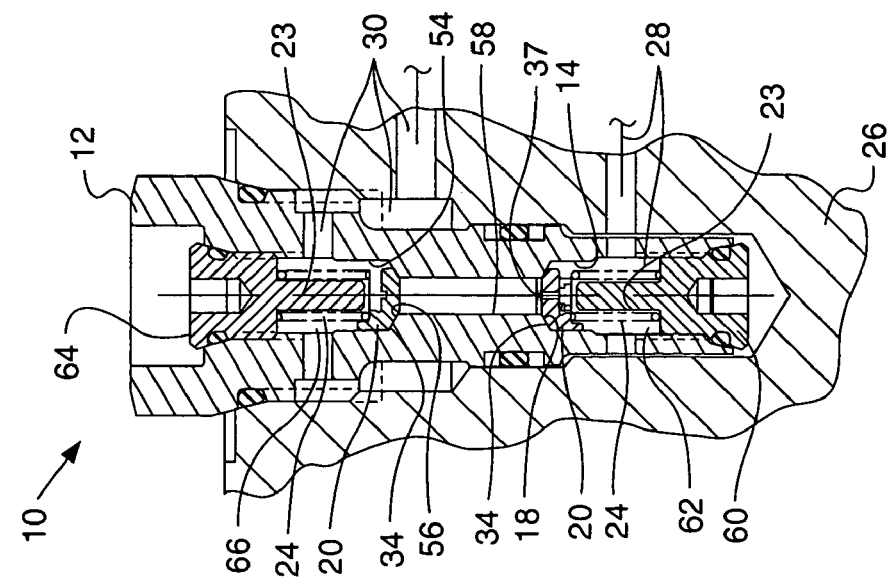

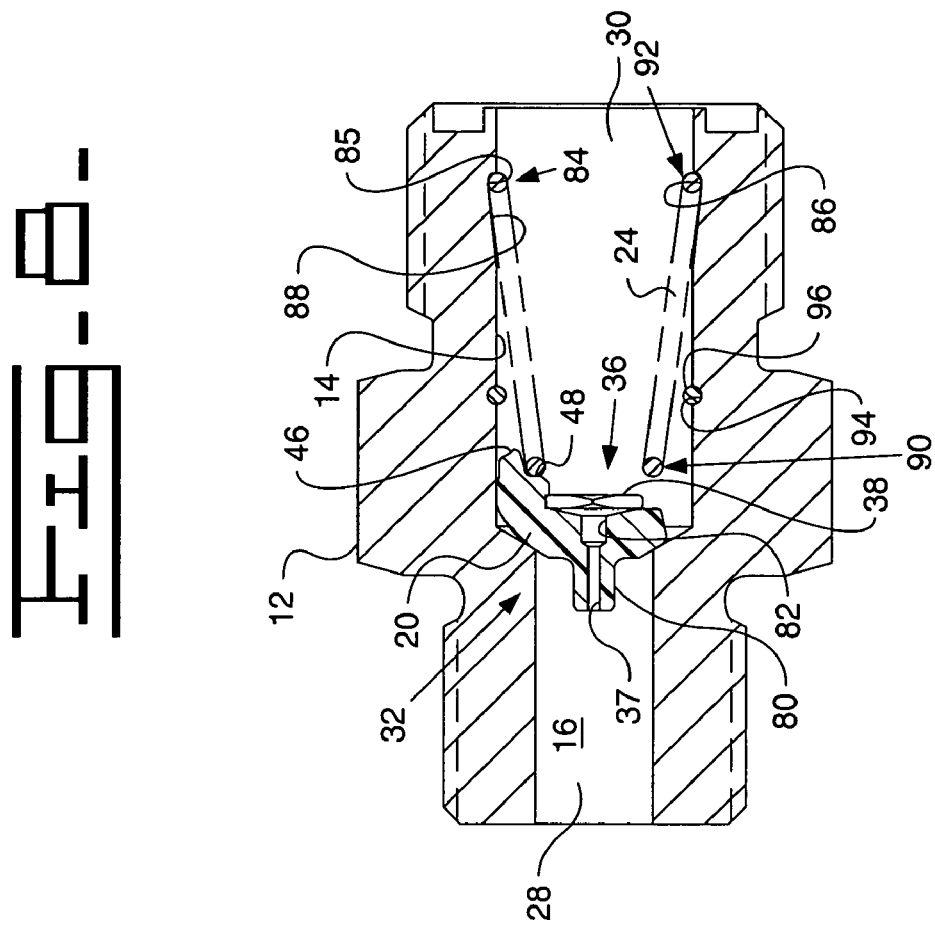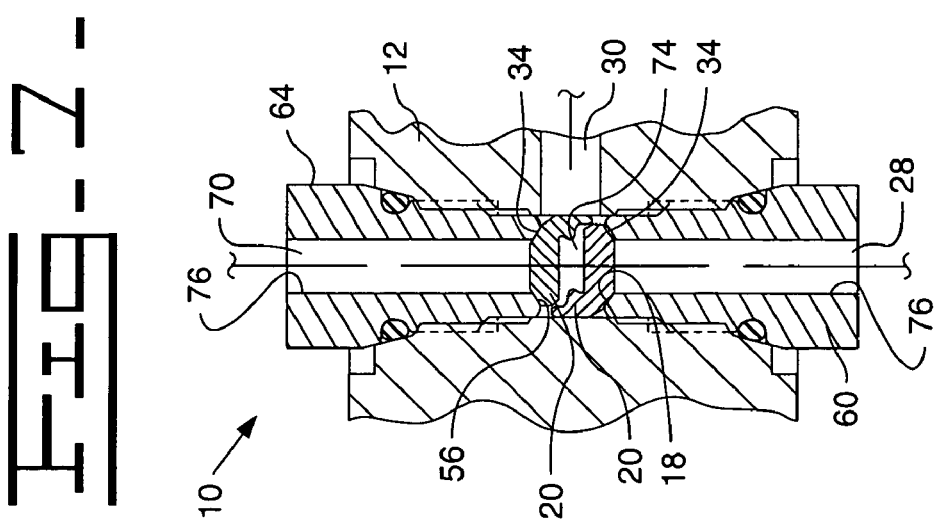

POPPET VALVE ARRANGEMENTS

TECHNICAL FIELD

The subject concept relates generally to poppet valve arrangements and more particularly to a versatile style poppet for use in various poppet valve arrangements.

BACKGROUND

Poppet valve arrangements are well known in the hydraulic art and take on various configurations and are used for various functions. Some of the well known functions for use of poppet valves are, for example, in check valves, low and high pressure resolver valves, orificed check valves, and choke and check valves. In these known uses of poppet valves, they normally are made from several different formed parts and/or parts that require various machining operations. For those that do not require machining, the structure is normally weaker, which shortens life expectancy, or the poppet and other components are made from multiple pieces. Furthermore, known types of poppet valves suffer from the poppet having a tendency to stick within its bore if the tolerance between the poppet and the bore is not closely held. In order to maintain close tolerances, it is normally necessary to make the parts from metallic materials and provide a finish grind operation. Poppets with a flat sealing face and integral guide legs have been used in the past. The guide legs aid in prohibiting the poppet from turning or binding in its bore. However, these known poppets using four guide legs have been known to have a tendency to bind due to the fact that they are using an even number of guide legs. Such a poppet has been previously used in the market and is illustrated in the engineering drawing #105-4593 that was produced by Caterpillar Inc. Furthermore, when using non-metallic materials to make the poppet, the flat sealing face may tend to limit the strength of the poppet.

The subject concept is directed to overcome one or more of the problems set forth above.

SUMMARY OF THE INVENTION

In one aspect of the present invention, a poppet valve arrangement is provided and includes a housing defining a bore and having a valve seat adjacent to one end of the bore, and a fluid inlet and a fluid outlet connected to the bore. The poppet valve arrangement also includes a poppet disposed between the fluid inlet and the fluid outlet. The poppet has a valving surface operative to sealing mate with the valve seat in the housing. The poppet also has an odd number of integral guide legs disposed about the periphery of the poppet and of a size sufficient to permit free flow of fluid thereby and to permit the poppet to slide freely within the bore.

BRIEF DESCRIPTION OF THE DRAWINGS

FIGS. 2A,B,C are various enlarged views of the poppet from the poppet valve arrangement of FIG. 1;

FIG. 3 is an enlarged view of another embodiment of the poppet used in the poppet valve arrangement of FIG. 1;

FIG. 4 is a diagrammatic representation of another embodiment of a poppet valve arrangement having yet another poppet embodiment;

FIG. 5 is a diagrammatic representation of a poppet valve arrangement using two different poppet embodiments;

FIG. 6 is a diagrammatic representation of a poppet valve arrangement for use as a low pressure resolver;

FIG. 7 is a diagrammatic representation of a poppet valve arrangement for use as a high pressure resolver; and FIG. 8 is a diagrammatic representation of yet another embodiment of a poppet valve arrangement having yet another poppet embodiment

DETAILED DESCRIPTION

Figure 1:
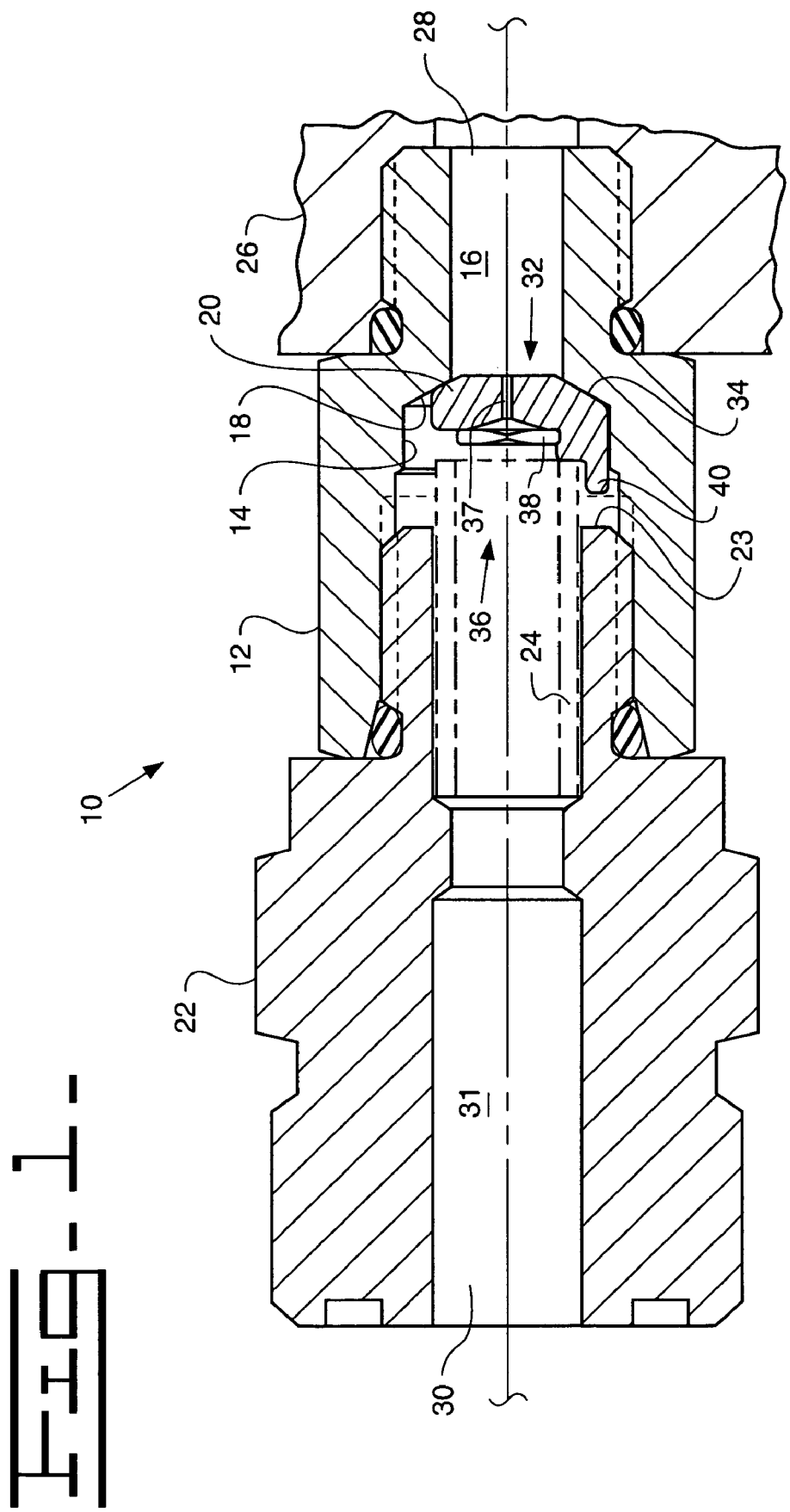
FIG. 1 is a diagrammatic representation of a poppet valve arrangement illustrating one embodiment of the subject invention.

Referring to FIG. 1 of the drawings, a poppet valve arrangement 10 is illustrated. The poppet valve arrangement 10 includes a housing 12 defining a bore 14 and a through passage 16 that intersects the bore 14 and forms a valve seat 18 thereon at one end of the bore 14. The valve seat 18 of the subject embodiment is conical in shape. It is recognized that the shape of the valve seat 18 could be of various shapes.

A poppet 20 is slideably disposed in the bore 14 and a plug member 22 is disposed in the bore 14 at the other end thereof. The plug member 22 has a stop member 23 disposed thereon and is operative to limit the travel of the poppet 20 away from the valve seat 18. A biasing member 24 is disposed in the housing 12 between the plug member 22 and the poppet 20. The biasing member 24 is operative to urge the poppet 20 into sealing engagement with the valve seat 18. The biasing member 24 of FIG. 1 is a well known cylindrical spring.

The housing 12 of the poppet valve arrangement 10 is mounted to a block arrangement 26 and has a fluid inlet 28 in communication with the bore 14 through the passage 16 and a fluid outlet 30 that is in communication with the bore 14 through a passage 31 defined in the plug member 22. The block arrangement 26 could be various types of hydraulic control valves, manifold blocks or any other element that requires fluid flow to and from the block. It is also recognized that the housing 12 could be the same as the block arrangement 26.

The poppet 20 has an end portion 32 having a valving surface 34 disposed thereon. The poppet 20 also has another end portion 36. The poppet 20 may be made from various types of materials, such as various metals or thermoplastics being filled with approximately 30 percent glass. The other end portion 36 of the poppet 20 has an odd number of integral guide legs 40 disposed thereon evenly space about the periphery thereof. The respective guide legs 40 are of a size to permit free flow of fluid thereby when unseated and to permit the poppet 20 to freely slide within the bore 14. A passage 37 is defined in the poppet 20 and extends therethrough from the end portion 32 to the other end portion 36. A filter element 38 is disposed in the poppet 20 generally between the odd number of integral guide legs 40 and adjacent to the passage 37. The filter element 38 may be of the wire mesh type or other known types that trap foreign particles. As illustrated, it should be recognized that the poppet valve arrangement 10 of FIG. 1 is being used as an in-line, orificed check valve.

Referring to FIGS. 2A, B, & C of the drawings for additional details, enlarged views of the poppet 20 are illustrated. Like elements have like element numbers. The valving surface 34 of the embodiment of FIG. 2A-C is spherical in shape and operatively mates with the conical valve seat 18 of the housing 12. A longitudinal reference axis 41 is defined in the poppet 20. The respective integral guide legs 40 are disposed on the other end portion 36 and extend from the end portion 32 generally parallel with the reference axis 41. Five integral guide legs 40 are disclosed and prove to be an optimum number. However, it is recognized that a greater number of integral guide legs could be used. In order to resist the tendency for the poppet 20 to stick within the bore 14, it is preferred to use an odd number of integral guide legs 40.

A support surface 42 is disposed on the other end portion 36 generally perpendicular to the reference axis 41. A groove 44 is defined in the integral guide legs 40 of the other end portion 36 at a location on the inner sides thereof and adjacent to the support surface 42. The groove 44 is of a size sufficient to receive and secure the filter element 38.

A stop surface 46 is disposed on the other end portion 36 of the poppet 20 and operative to engage the stop member 23 of the plug member 22. The engagement of the stop surface 46 with the stop member 23 limits the travel of the poppet 20 away from its valve seat 18.

A spring biasing surface 48 is disposed on the other end portion 36 of the poppet 20 at a location on the inner side of the odd number of integral guide legs 40. The spring biasing surface 48 is positioned generally perpendicularly with the reference axis 41 and between the support surface 42 and the stop surface 46. The biasing member 24 contacts the spring biasing surface 48 and urges the poppet 20 towards the valve seat 18. Since the biasing member 24 contacts the spring biasing surface 48 inwardly from the stop surface 46, portions of the integral guide legs 40 locates and maintains the biasing member 24 in its proper position.

A relief cavity 50 is defined in the poppet 20. The relief cavity 50 is generally concentric with the passage 37 and extends inwardly from the support surface 42. The relief cavity 50 has an irregular shape at the support surface 42 and the irregular shape tapers in a conical manner towards the reference axis 41 as the relief cavity 50 extends inwardly. The relief cavity 50 has a size at the support surface 42 that is smaller than the size of the filter element 38. The relief cavity 50 functions to prohibit the passage 37 from being plugged in the event the filter element 38 collapses or fails during use.

Referring to FIG. 3, another embodiment of the poppet 20 is illustrated. Like elements have like element numbers. The poppet 20 of FIG. 3 is basically the same as the poppet of FIGS. 2A,B,C and may be used in the poppet valve arrangement of FIG. 1. The main differences are that the relief cavity 50 and the passage 37 are deleted. Likewise, if the poppet 20 of FIG. 3 is used in the poppet valve arrangement 10 of FIG. 1, the filter element 38 would not be needed. It is recognized that the groove 44 would not be required but it is also recognized that in order to minimize the change in tooling when switching from making the embodiment of FIG. 2 to making the embodiment of FIG. 3, the groove 44 would not have to be removed.

Referring to FIG. 4 another embodiment of the poppet valve arrangement 10 is illustrated. Like elements have like element numbers. In the poppet valve arrangement 10 of FIG. 4, the main differences are that the valving surface 34 of the poppet 20 is flat and the valve seat 18 is flat. Additionally, in order to ensure that a proper flat valve seat 18 is achieved, a relief groove 52 is provided in the housing 12 at the intersection of the flat valve seat 18 and the end or bottom of the bore 14. As illustrated, it should be recognized that the poppet valve arrangement 10 of FIG. 4 is being used as an in-line, orificed check valve.

Referring to FIG. 5, another embodiment using the poppet valve arrangement 10 is illustrated. Like elements have like element numbers. The housing 12 has the fluid inlet 28, the fluid outlet 30, the bore 14 (hereafter referred to as the first bore 14), the valve seat 18 (hereafter referred to as the first valve seat 18), a second bore 54, and a second valve seat 56. A passage 58 defined in the housing 12 interconnects the first bore 14 with the second bore 54. The first valve seat 18 is formed at the intersection of the first bore 14 and the passage 58 and the second valve seat 56 is formed at the intersection of the passage 58 and the second bore 54. Consequently the first and second valve seats 18 and 56 are opposed to each other. Furthermore, the first valve seat 18 is located between the fluid inlet 28 and the fluid outlet 30 and the second valve seat 56 is located downstream of the first valve seat 18 and upstream of the fluid outlet 30.

A first plug 60 is disposed in the first bore 14 on the end thereof opposite to the first valve seat 18 to define a first fluid chamber 62 that is in open communication with the fluid inlet 28. A second plug 64 is disposed in the second bore 54 on the end thereof opposite to the second valve seat 56 to define a second fluid chamber 66 that is in open communication with the fluid outlet 30. A first poppet 20 is disposed in the first fluid chamber 62 so that the valving surface 34 thereof is in sealing contact with the first valve seat 18. A second poppet 20 is disposed in the second fluid chamber 66 so that the valving surface 34 thereof is in contact with the second valve seat 56. As illustrated, each of the plugs have a stop member 23 thereon that function to limit the travel of the respective poppets 20 away from their initial sealed positions. It is also recognized that the first plug 60 would not need a stop member 23 since the poppet 20 does not normally move away from its seated position, as will be described later. The poppet valve arrangement 10 of FIG. 5 is being used to orifice flow in one direction and to check the flow in the opposite direction.

As illustrated in FIG. 5, the first poppet 20 is of the type illustrated in FIG. 1, including the filter element 38, and the second poppet 20 is of the type illustrated in FIG. 3 that has no passage 37.

Referring to FIG. 6, another embodiment using the poppet valve arrangement 10 is illustrated. Like element have like element numbers. In the embodiment of FIG. 6, the housing 12 is very similar to the housing 12 of FIG. 5. The fluid outlet 30 is in open communication with the passage 58 between the first and second valve seats 18, 56. The first valve seat 18 is located between the fluid inlet 28 (hereafter referred to as the first fluid inlet 28) that is open communication with the first fluid chamber 62 and the fluid outlet 30. The second valve seat 56 is located between the fluid outlet 30 and a second fluid inlet 70 that is in open communication with the second fluid chamber 66. A spacer member 72 is disposed in the passage 58 between the first poppet 20 and the second poppet 20 and is of a length sufficient to ensure that only one of the first and second poppets 20 can be seated at one time against its respective valve seats 18, 56 at one time. The spacer member 72 is also of a size to permit free flow of fluid through the passage 58 at all times. As illustrated, the first and second poppets 20 are of the type illustrated in FIG. 3. In the subject embodiment, the poppet valve arrangement 10 is being used as a low pressure resolver valve.

Referring to FIG. 7, another embodiment of the poppet valve arrangement 10 is illustrated. Like elements have like element numbers. In the subject embodiment, two poppets 20 like the type illustrated in FIG. 3 are disposed in the bore 14. The two poppets 20 are positioned so that the odd number of integral guide legs 40 is facing one another to form a chamber 74 therebetween that is in open communication with the fluid outlet 30. Furthermore, one poppet 20 is rotated relative to the other poppet 20 so that the respective integral guide legs 40 overlap one another within the bore 14. This relationship permits the total size of the subject embodiment to be small.

Each of the first and second plugs 60,64 of the subject embodiment has a passage 76 defined therethrough. The passage 76 of the first plug 60 is in open communication with the first fluid inlet 28 and the passage 76 of the second plug 64 is in open communication with the second fluid inlet 70. The first valve seat 18 is formed on the first plug 60 adjacent to the chamber 74 and at the intersection of the end of the first plug 60 and the passage 76 defined therein. The second valve seat 56 is formed on the second plug 64 adjacent to the chamber 74 and at the intersection of the end of the second plug 64 and the passage 76 defined therein. The subject embodiment is being used as a high pressure resolver valve.

Referring to FIG. 8 another embodiment of a poppet valve arrangement 10 is illustrated. The poppet valve arrangement 10 of the subject embodiment is illustrated as an in-line, orificed check valve. Like elements have like element numbers. The poppet 20 of the subject arrangement is generally the same as that shown in FIG. 1 except for the following differences. An extension 80 is disposed on the end portion 32 thereof. The extension 80 has a predetermined length and a cross-sectional area that is substantially smaller than the passage 16. The passage 37 extends through the extension 80 and a pilot passage 82 is defined therein between the passage 37 and the relief cavity 50.

As in FIG. 1, passage 16 intersects the bore 14 and the valve seat 18 is disposed at the intersection thereof. A spring retaining groove 84 is defined in the housing 12 and located in the bore 14 spaced from the valve seat 18. The spring retaining groove 84 has a bottom surface 85, a first side surface 86 located away from the valve seat 18, and a second side surface 88 located on the side of the spring retaining groove 84 that is nearer to the valve seat 18. The first side surface 86 is generally perpendicular with the bore 14 and the second side surface 88 is angled with respect to the bore 14 from the bottom surface 85 to the bore 14 in a direction towards the valve seat 18.

The biasing member 24 of the subject embodiment is in the form of a conical spring. The conical spring 24 has a first, smaller end 90 that is of a size sufficient to be received within the plurality of integral guide legs 40 of the poppet 20 and abut the spring biasing surface 48 thereof. A second, larger end 92 of the conical spring 24 is of a size sufficient to engage the bottom surface 85 of the spring retaining groove 84. When installed, the second, larger end 92 is disposed in the spring retaining groove 84 and abuts both the bottom surface 85 and the first side surface 86 thereof.

A snap ring groove 94 is defined in the housing 12 and located within the bore 14 between the spring retaining groove 84 and the valve seat 18. The snap ring groove 94 is spaced a predetermined distance from the valve seat 18 and a snap ring 96 is disposed in the snap ring groove 94. The snap ring 96 is operative to limit the travel of the poppet 20 away from the valve seat 18.

In the subject embodiment of FIG. 8, each end of the housing 12 is threaded in order for the poppet valve arrangement 10 to be installed inline. One end thereof is arranged to use a standard o-ring seal at a shoulder of the mating connection and the other end thereof utilizes a face seal that engages a surface of the mating connecting. It is recognized that the respective ends of the subject poppet valve arrangement 10 may be of the same type of connection or that they may be different. It is also recognized that the sizes of the threaded ends may vary between different sizes depending on system requirements.

With minor modifications to the poppet 20, the subject poppet valve arrangement 10 of FIG. 8 would function only as a one-way check valve. It would only be necessary to eliminate the passage 37, the pilot passage 82, the relief cavity 50 and the filter element 38. All other aspects of the poppet valve arrangement 10 would remain the same. Other obvious modifications could be made without departing from the essence of the subject invention.

It is recognized that various alternatives could be used in the subject embodiments of the poppet 20 and poppet valve arrangements 10. For example, the poppets and valve seats of FIGS. 1,4 & 8 could be readily interchanged or intermixed without departing from the essence of the subject invention. Subject only to the function needed, either of the poppets 20 or valve seats 18 could be used in either of the embodiments of FIGS. 5-8. By making only minor modifications to the housing 12 of FIG. 6, two poppets 20 like that of FIG. 8 could be used therein and not require the spacer member 72. The minor modifications needed for the housing 12 would merely be locating the valving seats 18,58 at a predetermined distance from each other. The predetermined distance would be a distance that is less than two times the length of the extension 80. Consequently, the extensions 80 would contact each other and only permit one of the valving surfaces 34 of the two poppets 20 to seat at one time against the respective valve seats 18,58. Likewise, embodiments other than those shown in the drawings could be designed to incorporate the features of the subject poppets 20 and valve seats 18.

INDUSTRIAL APPLICABILITY

In the operation of the poppet valve arrangement 10 of FIG. 1, fluid flow is directed into the fluid inlet 28. The force of the fluid acting on the end of the poppet 20 moves the poppet 20 against the bias of the biasing member 24 towards the stop member 23 of the plug member 22. The odd number of integral guide legs 40 keeps the poppet 20 moving straight in the bore 14. Fluid in the passage 16 flows freely around the first end portion 32 of the poppet 20, along the respective sides of the odd number of integral guide legs 40, and to the fluid outlet 30 through the passage 31. When the flow of the fluid is reversed or the flow across the passage 37 is being used to control another device, the force of the flow along with the force of the biasing member 24, urges the valving surface 34 of the poppet 20 to sealingly seat against the valve seat 18. A small portion (orificed flow) of the flow is permitted to flow across the filter element 38 through the passage 37 and to the inlet port 28. The passage 37 serves to damp the flow being directed therethrough.

The filter element 38 serves to filter or trap particles that might plug the passage 37. If the filter element 38 fails to the extent that it collapses, the relief cavity 50 function to maintain a pathway to the passage 37 that might otherwise be blocked by the collapse of the filter element 38.

The odd number of integral guide legs 40 serves to keep the poppet 20 in true alignment with the centerline of the bore 14. Due to the odd number of integral guide legs 40, there is never another integral guide leg 40 located directly across from another one. Consequently, slight misalignment of the poppet 20 within the bore 14 does not result in binding of the poppet 20 in the bore 14. The interface of the spherical valving surface 34 with the conical valve seat 18 provides very good sealing characteristics. Additionally, the combination of the spherical valving surface 34 with the odd number of integral guide legs 40 adds additional strength to the poppet 20.

The operation of the embodiment of FIG. 4 is substantially the same as the operation of the embodiment of FIG. 1. The only difference is that the valving surface 34 and the valve seat 18 are both flat.

In the operation of FIG. 5, fluid is directed into the inlet port 28, into the first fluid chamber 62, across the filter element 38, through the passage 37 (orificed flow) of the first poppet valve 20, and through the passage 58. The force of the fluid in the passage 58 urges the second poppet 20 away from the second valve seat 56 against the bias of the biasing element 24. The flow is then directed around the end portion 32 of the second poppet 20, by the odd number of integral guide legs 40 and onto the fluid outlet 30. Once the fluid flow into the inlet port 28 ceases, the back flow from the fluid outlet 30 quickly seats the second poppet valve 20 against the valve seat 56. Consequently, back flow from the fluid outlet 30 is promptly stopped. Any residual pressurized fluid in the passage 58 is quickly dissipated across the passage 37 of the first poppet 20. The quick reduction of pressure of the pressurized fluid in the passage 58 normally does not unseat the first poppet 20.

In the operation of FIG. 6, the first and second fluid inlets 28,70 are each connected to separate sources of pressurized fluid. When a higher pressure exists at the first fluid inlet 28, the pressure of the fluid in the first fluid chamber 62 acts, in conjunction with the biasing member 24, to urge the first poppet 20 against the valve seat 18. At the same time, the spacer member 72 acts to unseat the second poppet 20. Consequently, the source of low pressure fluid at the second fluid inlet 70 is available to the fluid outlet 30 through the second fluid chamber 66, across the second poppet 20, through the passage 58 and to the fluid outlet 30.

If the pressure of the fluid in the second fluid inlet 70 increases to a level higher than that at the first fluid inlet 28, the higher pressure urges the second poppet 20, in cooperation with the biasing member 24, against the valve seat 56 to block fluid flow thereacross. At the same time, the spacer member 72 acts to unseat the valving surface 34 of the first poppet 20 away from the valve seat 18. Once the first poppet 20 is unseated, the low pressure fluid at the first fluid inlet 28 is directed across the first poppet 20 and through the passage 58 to the fluid outlet 30.

In the operation of the embodiment of FIG. 7, the first and second fluid inlets 28,70 are connected to respective separate sources of pressurized fluid. When the pressure of the fluid at the first fluid inlet 28 is higher than the pressure of the fluid at the second fluid inlet 70, the higher pressurized fluid acts against the first poppet 20 urging it away from its valve seat 18. The force of the pressurized fluid in the first fluid inlet 28 urges the first poppet 20 against the second poppet 20 and secures the second poppet 20 against its valve seat 56. Consequently, the higher pressurized fluid is directed across the first poppet 20 to the fluid outlet 30 while the higher pressurized fluid is blocked from the second fluid inlet 70 by the second poppet 20.

If the pressure of the fluid in the second fluid inlet 70 increases to a level greater than that at the first fluid inlet 28, the force of the higher pressurized fluid acts against the second poppet 20 urging it away from its seat 56. At the same time the force from the higher pressurized fluid forces and holds the first poppet 20 against its valve seat 18. Consequently, the higher pressurized fluid in the second fluid inlet 70 is directed across the second poppet 20 to the fluid outlet 30 while the higher pressurized fluid is blocked from communicating with the first fluid inlet 28 by the first poppet 20.

In the operation of the embodiment of FIG. 8, fluid flow entering the passage 16 from the fluid inlet 28 would urge the poppet 20 to move against the bias of the conical spring 24 away from the valve seat 18. Fluid flow would freely pass across the open poppet 20 to the bore 14 and to the fluid outlet 30. The degree of movement of the poppet 20 away from the valve seat 18 would be limited by the snap ring 96. Once the fluid flow is terminated, the conical spring 24 urges the sealing surface 34 of the poppet 20 into engagement with the valve seat 18. Since the conical spring 24 is retained in the spring retaining groove 84 of the housing 12, no additional elements are needed to hold the conical spring in place. Furthermore, the angle of the second side surface 88 of the spring retaining groove 84 serves two purposes. First, it provides clearance for a portion of the conical spring 24 that is near the second, larger end 92 thereof. Second, it aids in the assembly of the snap ring 96. Since the snap ring 96 would initially snap into the spring retaining groove 84, the angled, second side surface 88 would allow the snap ring 96 to be pushed along the angled, second side surface 88 until it has again been compressed to slide through the bore 14 and into the snap ring groove 94.

It is recognized that the fluid inlet 28 and fluid outlet 30 could be interchangeable. For example, fluid flow could be in the direction from the fluid outlet 30 towards the fluid inlet 28. Fluid flow in the noted direction would be limited by the passage 37 in the poppet 20. All fluid flow in the direction from the fluid outlet 30 towards the fluid inlet 20 would be screened/filtered by the filter element 38 in a well known manner.

The extension 80 on the poppet 20 not only allows more versatility for the poppet 20 but also acts to aid the flow of fluid across the poppet 20. Since the flow at the first end portion 32 of the poppet 20 must make a sharp and abrupt turn in order to get by the poppet 20, the flow is initially divided by the extension 80 prior to the flow reaching the valving surface 34. By initially using the extension 80 to begin dividing the fluid flow, the problems associated with the sharp and abrupt turn is minimized.

In view of the foregoing, it is readily apparent that the subject poppet valve arrangement 10 is cost effective due the components being more compact and not requiring precision tolerances or major machining. Likewise, due to the odd number of integral guide legs 40, the poppet 20 has less of a tendency to bind within the bore. Furthermore, the integral nature of the guide legs 40 in combination with the spherical valving surface 34, provides a poppet that is compact and versatile, has high strength, and good durability.

Other aspects, objects and advantages of the invention can be obtained from a study of the drawings, the disclosure and the appended claims.

What is claimed is:

1. A poppet valve arrangement, comprising:
   a housing defining a bore and having a valve seat adjacent to one end of the bore and a fluid inlet and a fluid outlet connected to the bore; and
   a poppet disposed between the fluid inlet and the fluid outlet, the poppet having a valving surface on an end portion thereof and operative to sealingly mate with the valve seat of the housing and the poppet having an odd number of integral guide legs on another end portion thereof and the integral guide legs being disposed about the periphery of the poppet and of a size sufficient to permit free flow of fluid thereby and to permit the poppet to slide freely within the bore, each of the integral guide legs having a first end portion integrally attached to the another end portion and a second, freely extending end portion extending away from the another end portion in a direction away from the end portion having the valving surface: and a passage defined therethrough from the end portion to the other end portion thereof, the poppet valve includes a support surface on the other end portion thereof and defines a relief cavity extending inwardly from the support surface thereof and the relief cavity is concentric with the passage defined therein, wherein the relief cavity is generally irregular at the support surface and conical in shape as it extends inwardly from the support surface.

2. The poppet valve arrangement of claim 1 wherein the poppet has a stop surface on the other end portion thereof opposite to the valving surface, the step surface being the ends of at least a portion of the freely extending integral guide legs, and the poppet valve arrangement includes a plug member disposed at the other end of the bore and having a stop member thereon, the stop member being disposed in the bore at a predetermined location from the poppet.

3. The poppet valve arrangement of claim 2 wherein the poppet includes a spring biasing surface on the other end portion thereof opposite to the valving face and the poppet valve arrangement includes a biasing member disposed between the spring biasing surface of the poppet and the plug member.

4. The poppet valve arrangement of claim 1 wherein the poppet has five integral guide legs.

5. The poppet valve arrangement of claim 2 wherein the valving surface of the poppet is flat and the valve seat in the housing is flat.

6. The poppet valve arrangement of claim 3 wherein a portion of the integral guide legs encircles the end of the biasing member.

7. The poppet valve arrangement of claim 1 wherein a groove is defined in the poppet generally adjacent to the support surface on the poppet and the groove circumscribes the passage, the poppet valve arrangement includes a filter disposed generally adjacent to the support surface on the poppet and is disposed within the groove.

8. A poppet valve arrangement, comprising:

a housing defining a bore and having a valve seat adjacent to one end of the bore and a fluid inlet and a fluid outlet connected to the bore; and a poppet having first and second end portions and being disposed between the fluid inlet and the fluid outlet, the poppet having a valving surface on the end portion thereof that is operative to sealingly mate with the valve seat of the housing and a support surface on the other end portion thereof, a passage is defined in the poppet from the end portion to the other end portion thereof, a relief cavity is defined in the poppet generally concentric with the passage and extends inwardly from the support surface thereof, said relief cavity being generally irregular at the support surface and conical in shape as it extends inwardly from the support surface, and the poppet has a plurality of integral guide legs on another end portion thereof and the integral guide legs being disposed about the periphery of the poppet and of a size sufficient to permit free flow of fluid thereby and to permit the poppet to slide freely within the bore, each of the integral guide legs having a first end portion integrally attached to the another end portion and a second, freely extending end portion extending away from the another end portion in a direction away from the end portion having the valving surface.

9. The poppet valve arrangement of claim 8 wherein a groove is defined in the poppet generally adjacent to the support surface on the poppet and the groove circumscribes the passage, the poppet valve arrangement includes a filter disposed generally adjacent to the support surface on the poppet and is disposed within the groove.

\* \* \* \* \*